United States Patent [19]

Haggerty

[11] 4,331,254

[45] May 25, 1982

[54] SEALING ARRANGEMENT

[75] Inventor: John Haggerty, Warlingham, England

[73] Assignee: Butterworth Systems Inc., Florham Park, N.J.

[21] Appl. No.: 185,221

[22] Filed: Sep. 8, 1980

[30] Foreign Application Priority Data

Sep. 12, 1979 [GB] United Kingdom ................ 7931590

[51] Int. Cl.³ ...................... B65D 51/00; B65D 51/18
[52] U.S. Cl. .................................. 220/229; 215/247; 312/1
[58] Field of Search ................ 220/229, 254; 215/247; 312/1

[56] References Cited

U.S. PATENT DOCUMENTS

| 1,730,237 | 10/1929 | Patten | 220/88 A |
| 2,111,031 | 3/1938 | Newton | 221/84 |
| 2,436,291 | 2/1948 | Daniel | 215/247 |
| 2,793,373 | 5/1957 | Ewing | 220/229 |
| 2,803,370 | 8/1957 | Lennard | 312/1 |
| 3,086,674 | 4/1963 | Scheuerman | 312/1 |
| 4,030,629 | 6/1977 | Melnikov | 220/211 |

FOREIGN PATENT DOCUMENTS 522742 11/1928 Fed. Rep. of Germany ...... 64 C/33

Primary Examiner—George E. Lowrance

[57] ABSTRACT

A seal for an opening through which an object (e.g. hose pipe) extends which comprises a stack of flexible sheets (1, 2, 3 and 4) one on top of each other, each of at least two adjoining sheets (1, 2) having an aperture therein of dimensions smaller than those of the cross-section of that part of the object contacting the seal and a series of slits radiating from said aperture towards the perimeter of the sheet and each of at least two other adjoining sheets (3, 4) having a series of slits radiating towards the perimeter of the sheet from the center of the sheet, the series of slits in at least two adjacent sheets being offset with respect to each other.

16 Claims, 4 Drawing Figures

SEALING ARRANGEMENT

This invention relates to seals for openings, especially in storage tanks.

The space above the liquids in tanks used to store petroleum products is filled with vapour which can in some circumstances be explosive. This can cause problems, especially with tankers used for transporting oil. It is becoming common for such tanks to be blanketed with inert gas. However, if existing tank cleaning equipment is used to clean tanks after the cargo has been discharged this layer of inert gas will be lost. To avoid this loss of inert gas either new specially designed tank cleaning equipment has to be installed whereby the existing equipment will have to be written off or some seal has to be devised which will enable existing portable equipment still to be used but without loss of inert gas.

We have now devised a suitable seal. This is a seal for an opening in for example a container through which an object extends (usually on a temporary basis) and it comprises a stack of flexible sheets one on top of each other. Each of at least two adjoining sheets has an aperture therein, and a series of slits radiating from said aperture towards the perimeter of the sheet. Also each of at least two other adjoining sheets has a series of slits radiating towards the perimeter of the sheet from the area of the sheet adjacent to the aperture in the apertured sheets, these slits meeting each other in said area. Furthermore the series of slits in at least two adjacent sheets has to be offset with respect to each other.

The sheets are made of a flexible material and they must have sufficient rigidity to bridge the opening without collapsing into it, but they must be flexible enough to allow for some distortion during and after insertion of the object into the aperture. Suitable materials from which the flexible sheets are made are reinforced rubber or certain plastics materials.

Usually the stack will be of four sheets, two having an aperture and slits and two with slits only. However if desired there may be more than two of each type of sheet.

The sheets can be of any shape but often they will be circular, especially when used to seal hatch covers for oil storage tanks. In such cases the object will usually have a circular cross-section, for example it may be a hose pipe or the shaft of a tank cleaning machine. It is convenient for the aperture in the apertured sheets to be centrally disposed in the sheet, but such a central disposition is not essential.

The dimensions of the aperture must be smaller than the cross-sectional dimensions of that part of the object contacting the seal. Preferably the shape of the aperture is the same as that of the cross-section of the object. Thus for example both may be circular or both may be square or rectangular. When both are circular the radius of the aperture must be smaller than that of the cross-section of the object.

In the sheets there are series of slits radiating towards the perimeter of the sheet. Although one could just about manage with a pair of slits in each sheet, it is preferable to have at least three, and four, five or six or even more being more desirable. These slits preferably radiate symmetrically. The slits do not extend all the way towards the perimeter and usually it is convenient for them to extend about 40 to 60% of the distance from where they meet towards the perimeter. It is preferable if all the slits are substantially the same length.

As previously stated some sheets have an aperture whilst some others do not. For those not having an aperture the slits meet each other and radiate from the area of sheet which when stacked with the other sheets is adjacent to the apertures in the apertured sheets. In this manner the object can extend through the stack of sheets without severe distortion of the stack. When the apertured sheets have an aperture exactly central the slits in the non-apertured sheets will radiate from the centre of the sheet.

When the sheets are stacked together it is essential that the series of slits in at least two adjacent sheets be offset with respect to each other. Preferably the sheets in the stack are arranged so that the series of slits in all the sheets are offset with respect to each other. For example if there are four sheets in the stack, each sheet having six symmetrically placed slits, it is preferred that each slit be spaced 15° from the slit in each adjoining sheet.

When the stack is assembled it is highly desirable that all the apertured sheets adjoin one another and that all the non-apertured sheets adjoin one another. It is also essential for correct sealing that when the object is inserted into the seal, i.e. the stack of sheets, it first meets the apertured sheets and not the non-apertured sheets. It is also desirable that when assembled the apertures in the apertured sheets are in line with one another.

When using the seal for a system under pressure it is desirable that one of the non-apertured sheets is thicker than the other sheets, and this thicker sheet can for example be twice as thick as the other sheets. With a stack of four sheets this thicker sheet should be the inner of the two non-apertured sheets and so when the stack is correctly assembled this thicker sheet supports the apertured sheets whilst the bottom this (and non-apertured) sheet is forced upward against the thick sheet by the pressure of the system, e.g. gas pressure.

The seal must be supported round the perimeter of the opening and therefore the area of the seal should be greater than the cross-sectional area of the opening. Conveniently each sheet is provided with a series of bolt holes near the perimeter so that when the sheets are correctly aligned as regards apertures and slits, bolts can pass through all these bolt holes and the stack of sheets secured to the opening. Alternatively, the sheets can just be gripped round their edges so that the stack is secured to the opening.

The object can be of various forms. Thus, as previously stated it can be a hose pipe or the shaft of a tank cleaning machine. Alternatively it could be ullaging equipment, for example a tape.

The invention is now described with reference to the drawings in which

Figure 1:
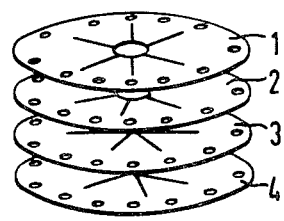
FIG. 1 is an exploded view of a stack of four flexible discs.

Referring to the drawings discs 1 and 2 are provided with central circular apertures 5 and 6 respectively, each together with six slits. The slits are indicated for disc 1 as 7, 8, 9, 10, 11 and 12. Discs 3 and 4 do not have apertures but each have six slits, five of which are indicated as 13, 14, 15, 16 and 17 in FIG. 3. All the discs are made of flexible rubber and all have a ring of circular bolt holes near the perimeter, one of which is shown as 18 in FIG. 2.

Figure 2:
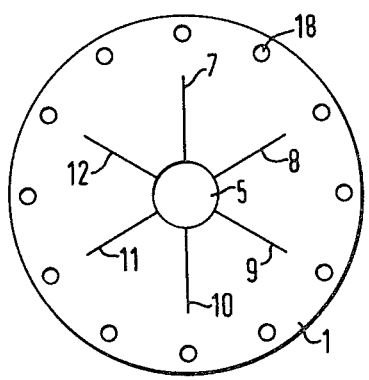
FIG. 2 shows a view of the top flexible disc.
Figure 3:
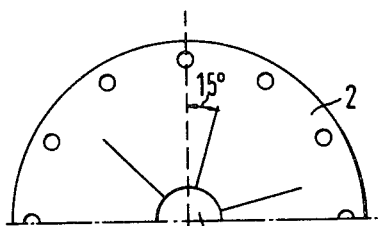
FIG. 3 shows views of half of the second, third and fourth discs.
Figure 3:
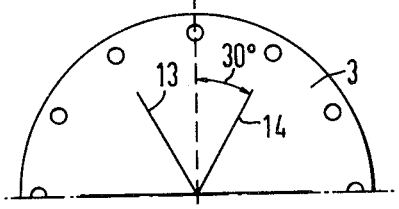
Figure 3:
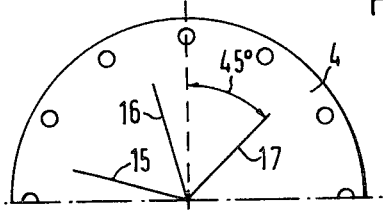

As can be seen in FIG. 1 and more clearly in FIGS. 2 and 3 all the slits are offset with respect to each other, there being a 15° angular shift of each slit when preceding from adjoining discs. The bolt holes are drilled so that when the slits are correctly offset all the bolt holes are aligned.

Figure 4:
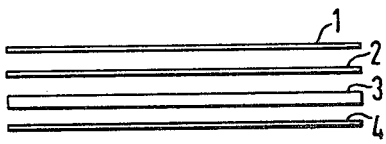
FIG. 4 shows a side view of the four discs but spaced apart.

As can be seen from FIG. 4 disc 3 is thicker than discs 1, 2 and 4 and if for example the discs are about 40 cm diameter, then discs 1, 2 and 4 could be 2 mm thick and disc 3 can be 4 mm thick.

The seal described above is very suitable for sealing a hatch cover for a petroleum tank on a tanker, the cargo being blanketed with inert gas. The diameter of apertures 5 and 6 will be less than the cross-sectional diameter of any hose pipe or shaft of tank washing machine which has to be inserted into the tank.

What is claimed is:

1. A seal for an opening through which an object extends which comprises a stack of flexible sheets one on top of each other, each of at least two adjoining sheets having an aperture therein and a series of slits radiating from said aperture towards the perimeter of the sheet and each of at least two other adjoining sheets having a series of slits meeting each other in an area of the sheet adjacent to said aperture in the apertured sheets and radiating towards the perimeter of the sheet, the series of slits in at least two adjacent sheets being offset with respect to each other.

2. A seal according to claim 1 wherein the sheets are made of reinforced rubber.

3. A seal according to claim 1 wherein the stack is of four sheets.

4. A seal according to claim 3 wherein the aperture in the apertured sheets is centrally disposed.

5. A seal according to claim 4 wherein each sheet has at least three slits.

6. A seal according to claim 1 wherein the slits extend 40% to 60% of the distance from where they meet towards the perimeter.

7. A seal according to claim 1 wherein the sheets in the stack are arranged so that the series of slits in all the sheets are offset with respect to each other.

8. A seal according to claim 3 wherein all the apertured sheets adjoin one another.

9. A seal according to claim 1 wherein each sheet is provided with a series of bolt holes near the perimeter thereof.

10. A seal according to claim 1 wherein an object is gripped by the seal, the dimensions of the aperture in said two adjoining sheets being smaller than those of the cross-section of that part of the object contacting the seal.

11. A seal for an opening through which an object extends which comprises a stack of four flexible sheets of reinforced rubber, one on top of each other, both of two adjoining sheets having an aperture therein and a series of at least three slits radiating from said aperture towards the perimeter of the sheet and both of the two other adjoining sheets having a series of at least three slits meeting each other in an area of the sheet adjacent to said aperture in the apertured sheets and radiating towards the perimeter of the sheet, the series of slits in at least two adjacent sheets being offset with respect to each other.

12. A seal according to claim 11 wherein the aperture in the apertured sheets is centrally disposed 13. A seal according to claim 11 wherein the slits extend 40% to 60% of the distance from where they meet towards the perimeter.

14. A seal according to claim 11 wherein the sheets in the stack are arranged so that the series of slits in all the sheets are offset with respect to each other.

15. A seal according to claim 11 wherein each sheet is provided with a series of bolt holes near the perimeter thereof.

16. A seal according to claim 11 wherein an object is gripped by the seal, the dimensions of the aperture in said two adjoining sheets being smaller than those of the cross-section of that part of the object contacting the seal.

* * * * *